(12) United States Patent
Sarkaria

(10) Patent No.: US 10,965,804 B2
(45) Date of Patent: Mar. 30, 2021

(54) METHOD AND APPARATUS OF ACQUIRING INFORMATION REGARDING APPLICATIONS FOR DISPLAY ON A USER INTERFACE

(71) Applicant: HMD Global Oy, Espoo (FI)

(72) Inventor: Sarbjit Singh Sarkaria, Richmond (CA)

(73) Assignee: HMD Global Oy, Espoo (FI)

( * ) Notice: Subject to any disclaimer, the term of this patent is extended or adjusted under 35 U.S.C. 154(b) by 505 days.

(21) Appl. No.: 15/427,641

(22) Filed: Feb. 8, 2017

(65) Prior Publication Data

US 2017/0149952 A1 May 25, 2017

Related U.S. Application Data

(63) Continuation of application No. 12/491,729, filed on Jun. 25, 2009, now abandoned.

(51) Int. Cl.
| | | |
|---|---|---|
| G06F 3/0481 | (2013.01) | |
| H04M 1/725 | (2021.01) | |
| G06F 8/60 | (2018.01) | |
| H04W 84/04 | (2009.01) | |

(52) U.S. Cl.
CPC .......... *H04M 1/72544* (2013.01); *G06F 8/60* (2013.01); *H04M 1/72525* (2013.01); *H04W 84/042* (2013.01)

(58) Field of Classification Search
CPC .................................................... G06F 3/0481
USPC ....................................................... 715/748
See application file for complete search history.

(56) References Cited

U.S. PATENT DOCUMENTS

| | | | | |
|---|---|---|---|---|
| 6,353,926 B1* | 3/2002 | Parthesarathy | ........... | G06F 8/65 |
| | | | | 707/999.202 |
| 6,574,618 B2* | 6/2003 | Eylon | ............... | H04L 29/06027 |
| 7,451,441 B2* | 11/2008 | Carter | ........................ | G06F 8/61 |
| | | | | 717/174 |
| 8,099,332 B2* | 1/2012 | Lemay | ................ | G06F 3/04817 |
| | | | | 705/26.1 |
| 8,484,728 B2* | 7/2013 | De Atley | .................. | G06F 8/61 |
| | | | | 726/22 |
| 2002/0131404 A1* | 9/2002 | Mehta | ................. | H04L 12/1403 |
| | | | | 370/352 |
| 2002/0169892 A1 | 11/2002 | Miyaoku et al. | | |
| 2004/0122924 A1* | 6/2004 | Coryell | ................... | H04L 67/34 |
| | | | | 709/223 |
| 2004/0152517 A1* | 8/2004 | Hardisty | ............... | G06Q 30/02 |
| | | | | 463/42 |
| 2005/0091268 A1 | 4/2005 | Meyer et al. | | |

(Continued)

FOREIGN PATENT DOCUMENTS

WO 2006090339 A1 8/2006

*Primary Examiner* — Reza Nabi
(74) *Attorney, Agent, or Firm* — Ditthavong, Steiner & Mlotkowski

(57) ABSTRACT

An approach is provided for acquiring information regarding installed applications on a user equipment. A request for information is received regarding one or more applications installed on user equipment in a category of applications. The request includes a respective unique identifier for the one or more applications. And, a transmission of the information is initiated including an icon corresponding to the one or more applications compiled using the respective unique identifier for the one or more applications.

19 Claims, 10 Drawing Sheets

(56) References Cited

U.S. PATENT DOCUMENTS

| | | | |
|---|---|---|---|
| 2006/0031529 A1* | 2/2006 | Keith, Jr. | G06F 8/65 709/227 |
| 2006/0106806 A1* | 5/2006 | Sperling | G06F 21/57 |
| 2006/0265727 A1* | 11/2006 | Vermola | H04M 1/2757 725/56 |
| 2007/0011494 A1* | 1/2007 | Xie | G06F 8/41 714/38.14 |
| 2008/0034314 A1* | 2/2008 | Louch | G06F 3/0481 715/778 |
| 2008/0127169 A1* | 5/2008 | Malasky | G06F 9/44547 717/174 |
| 2008/0171601 A1* | 7/2008 | Kirmse | A63F 13/795 463/42 |
| 2008/0250385 A1* | 10/2008 | Sanchez | G06F 8/61 717/100 |
| 2008/0263365 A1* | 10/2008 | Aupperle | H04L 63/0815 713/185 |
| 2008/0301231 A1* | 12/2008 | Mehta | H04L 67/34 709/204 |
| 2009/0022473 A1 | 1/2009 | Cope et al. | |
| 2009/0024617 A1 | 1/2009 | Cope | |
| 2009/0043825 A1* | 2/2009 | Bourne | G06F 16/14 |
| 2009/0077549 A1* | 3/2009 | Sadja | G06F 8/65 717/178 |
| 2009/0228779 A1* | 9/2009 | Williamson | H04L 67/2804 715/233 |
| 2009/0307105 A1* | 12/2009 | Lemay | G06F 9/453 705/26.1 |
| 2010/0070965 A1* | 3/2010 | Britten | G06F 8/65 717/173 |
| 2010/0179991 A1* | 7/2010 | Lorch | H04L 51/10 709/206 |
| 2010/0198843 A1* | 8/2010 | Sirota | G06F 8/60 707/754 |
| 2010/0211886 A1* | 8/2010 | Forstall | G06F 3/04817 715/745 |
| 2010/0250400 A1* | 9/2010 | Fernandez Gutierrez | G06Q 30/0603 705/26.1 |
| 2010/0313196 A1* | 12/2010 | De Atley | G06F 8/61 717/174 |
| 2010/0332996 A1* | 12/2010 | Sarkaria | G06F 8/60 715/748 |
| 2011/0016089 A1* | 1/2011 | Freedman | G06F 11/1448 707/640 |
| 2011/0071902 A1* | 3/2011 | Tan | G06Q 30/0251 705/14.49 |
| 2011/0161941 A1* | 6/2011 | Thomson | G06F 8/34 717/140 |
| 2011/0252344 A1* | 10/2011 | van Os | G06F 9/451 715/763 |
| 2013/0047150 A1* | 2/2013 | Malasky | G06F 9/44547 717/176 |
| 2013/0143544 A1* | 6/2013 | Noda | H04W 4/50 455/418 |
| 2013/0337908 A1* | 12/2013 | Gatto | G07F 17/323 463/29 |
| 2013/0339480 A1* | 12/2013 | Smithson | H04L 67/02 709/217 |
| 2016/0098701 A1* | 4/2016 | Harris | G06Q 20/3223 705/14.64 |

* cited by examiner

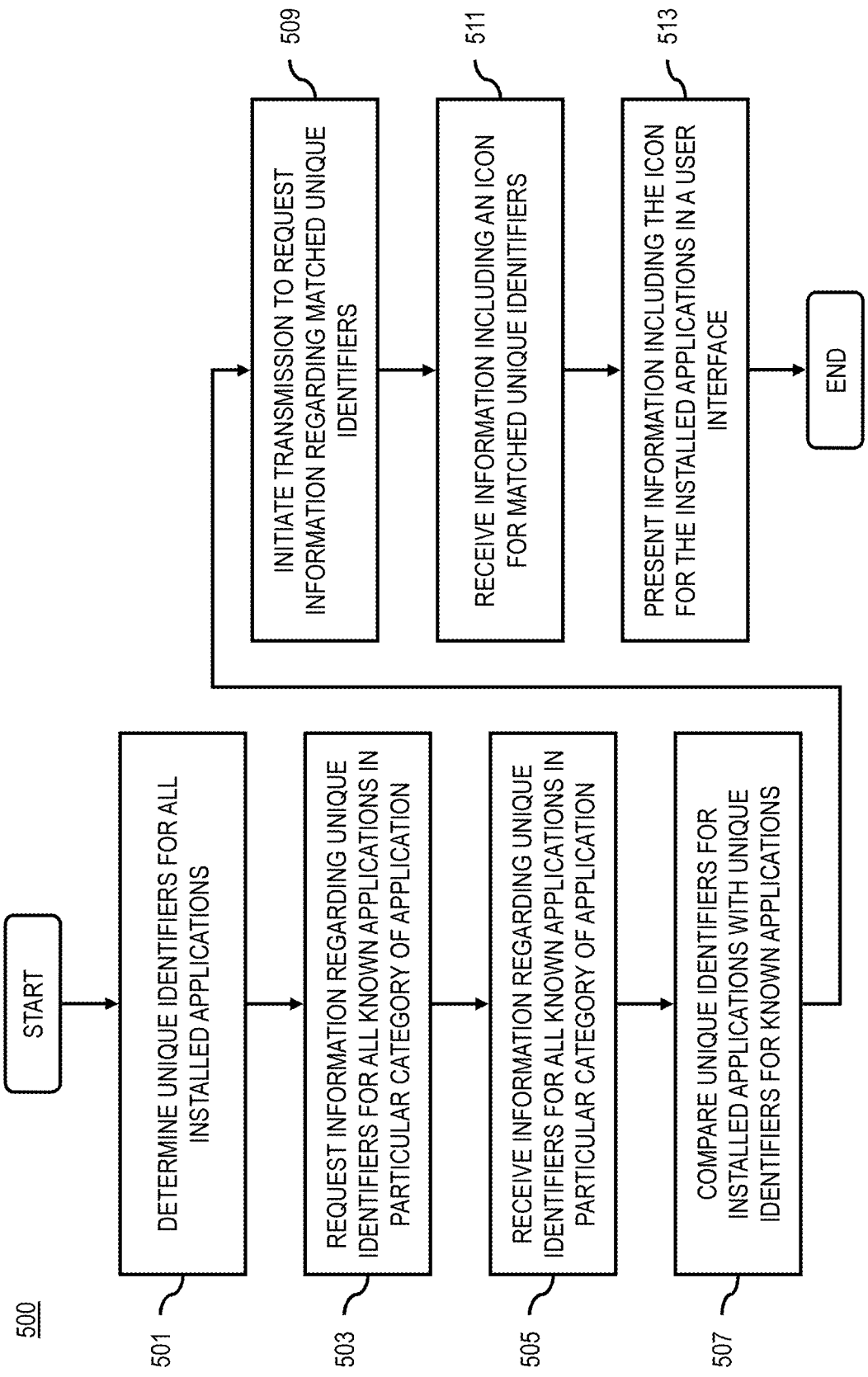

METHOD AND APPARATUS OF ACQUIRING INFORMATION REGARDING APPLICATIONS FOR DISPLAY ON A USER INTERFACE

RELATED APPLICATION

This application is a continuation of U.S. patent application Ser. No. 12/491,729, filed Jun. 25, 2009, entitled "Method and Apparatus of Acquiring Information Regarding Applications for Display on a User Interface," which is incorporated herein by reference in its entirety.

BACKGROUND

Wireless (e.g., cellular) service providers and device manufacturers are continually challenged to deliver value and convenience to consumers by, for example, providing compelling network services, applications, and content, as well as user-friendly devices. An important differentiator in this industry is the user interface. In particular, user interfaces that can provide information for display regarding installed applications on mobile devices.

SOME EXAMPLE EMBODIMENTS

According to one embodiment, a method comprises receiving a request for information regarding one or more applications installed on a user equipment in a category of applications, wherein the request includes a respective unique identifier for the one or more applications, and initiating transmission of the information including an icon corresponding to the one or more applications compiled using the respective unique identifier for the one or more applications.

According to another embodiment, an apparatus comprises at least one processor, and at least one memory including computer program code, the at least one memory and the computer program code configured to, with the at least one processor, cause the apparatus to perform at least the following: receive a request for information regarding one or more applications installed on a user equipment in a category of applications, wherein the request includes a respective unique identifier for the one or more applications; and initiate transmission of the information including an icon corresponding to the one or more applications compiled using the respective unique identifier for the one or more applications.

According to another embodiment, an apparatus comprises means for receiving a request for information regarding one or more applications installed on a user equipment in a category of applications, wherein the request includes a respective unique identifier for the one or more applications, and means for initiating transmission of the information including an icon corresponding to the one or more applications compiled using the respective unique identifier for the one or more applications.

According to another embodiment, a method comprises initiating transmission of a request for information regarding one or more applications installed on a user equipment in a category of applications, wherein the request includes a respective unique identifier for the one or more applications, and receiving the information including an icon corresponding to the one or more applications compiled using the respective unique identifier for the one or more applications.

According to another embodiment, an apparatus comprises at least one processor, and at least one memory including computer program code, the at least one memory and the computer program code configured to, with the at least one processor, cause the apparatus to perform at least the following: initiate transmission of a request for information regarding one or more applications installed on a user equipment in a category of applications, wherein the request includes a respective unique identifier for the one or more applications; and receive the information including an icon corresponding to the one or more applications compiled using the respective unique identifier for the one or more applications.

According to another embodiment, an apparatus comprises means for initiating transmission of a request for information regarding one or more applications installed on a user equipment in a category of applications, wherein the request includes a respective unique identifier for the one or more applications, and means for receiving the information including an icon corresponding to the one or more applications compiled using the respective unique identifier for the one or more applications.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5A is a flowchart of a process for requesting, receiving, and presenting information regarding applications that are installed on user equipment, according to one embodiment;

DESCRIPTION OF SOME EMBODIMENTS

A method and apparatus for acquiring information regarding installed applications on user equipment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
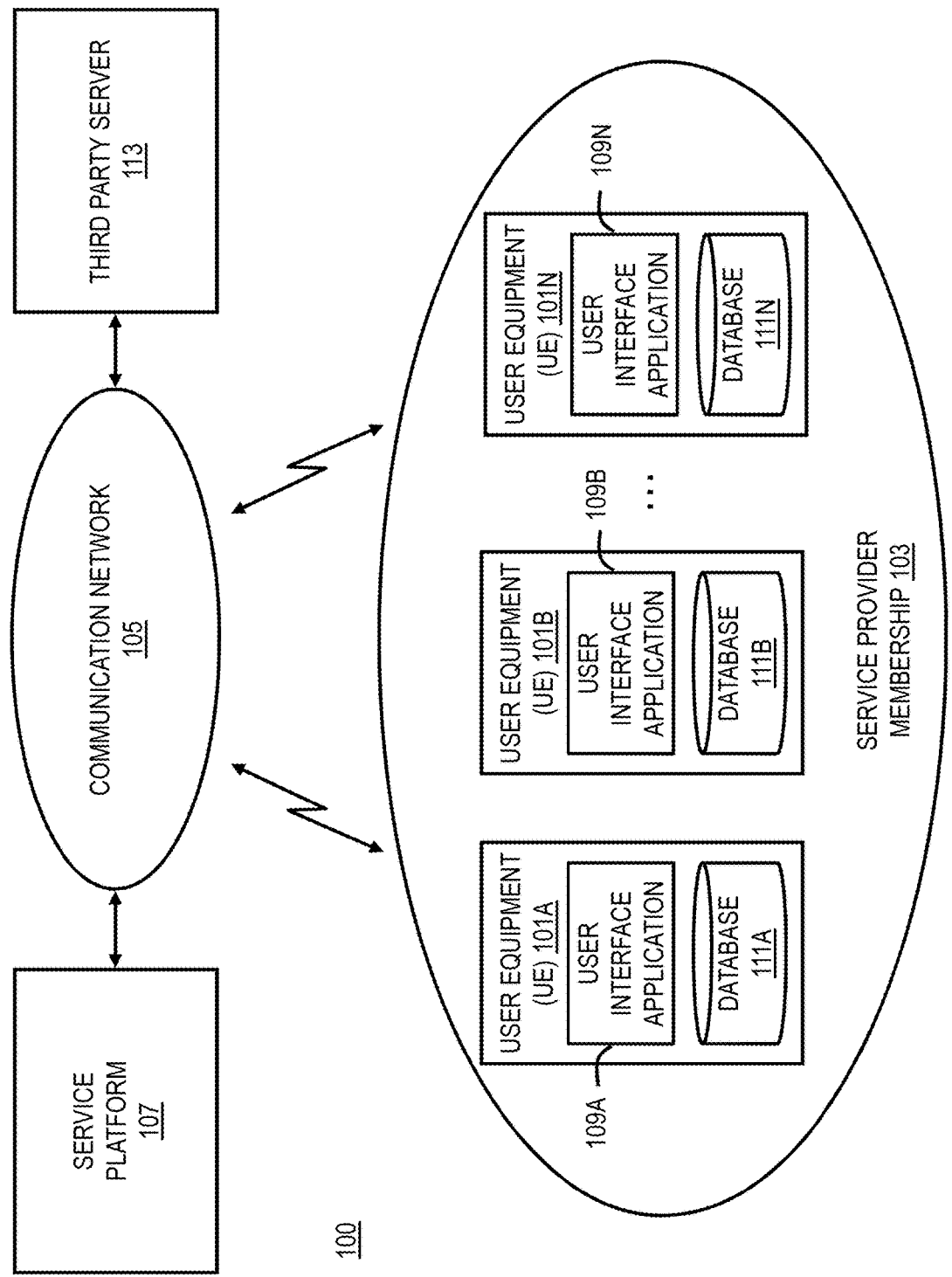
FIG. 1 is a diagram of a communication system capable of providing information regarding applications that are installed on user equipment, according to an example embodiment.

FIG. 1 is a diagram of a communication system 100 capable of providing information regarding installed applications on user equipment, according to an example embodiment. In certain embodiments, information regarding installed application on user equipment can be provided to the user equipment and a user can be presented with a graphical user interface (GUI) that provides the user with the ability to access the applications and/or information regarding the applications. As shown in FIG. 1, system 100 comprises one or more registered users or member user equipment (UEs), e.g., UEs 101A, 101B, . . . , 101N, within a service provider membership 103 and having connectivity to communication network 105, which is connected to a service application or platform 107. The UEs 101A-101N are generally described herein as mobile devices; however the UEs 101A-101N could by any type of mobile terminal, fixed terminal, or portable terminal including mobile handsets, mobile phones, mobile communication devices, stations, units, devices, multimedia tablets, digital book readers, game devices, audio/video players, digital cameras/camcorders, positioning device, televisions, radio broadcasting receivers, Internet nodes, communicators, desktop computers, laptop computers, Personal Digital Assistants (PDAs), or any combination thereof. The UEs 101 can employs a radio link to access network 105, or connectivity of the UEs 101 to the network 105 can be provided over a wired link. It is also contemplated that the UEs 101A-101N can support any type of interface to the user (such as "wearable" circuitry, etc.).

In example embodiments, the UEs 101A-101N each includes a user interface application 109A, 109B, . . . , 109N for providing a user interface for use by members of the service provider membership 103 to allow the various UEs 101A-101N to display information regarding the installed applications and allow a user to access and/or run the application. The user interface applications 109A-109N also facilitate the acquisition of the information regarding the installed applications from the service platform 107. Additionally, the UEs 101A-101N each includes a database 111A, 111B, . . . , 111N that store the applications installed on the respective UE and/or information, such as a unique identifier of the installed application, that can be used to compile a list of installed applications with unique identifiers thereof in order to acquire information regarding such applications from the service platform 107.

FIG. 1 also includes a third party server 113 that is in communication with the communication network 105. The third party server 113 can be, for example, in contact with the service platform 107 in order for the service platform 107 to obtain information regarding the installed applications, and/or in contact with the UEs 101A-101N in order for the UEs 101A-101N to obtain application for installation and use thereon.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UEs 101A-101N communicate with the service platform 107 over the communication network 105 using standard protocols. The UEs 101A-101N and the service platform 107 are network nodes with respect to the communication network 105. In this context, a protocol includes a set of rules defining how the network nodes within the communication network 105 interact with each other based on information sent over the communication links. For instance, members of the service provider membership 103 may communicate using a networking protocol. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2)

header, an internetwork (layer 3) header and a transport (layer 4) header, and various application headers (layer 5, layer 6 and layer 7) as defined by the OSI Reference Model.

According to certain embodiments, system 100 can be advantageously utilized in various situations to provide information, such as icons, to user equipment for applications that are installed locally to the user equipment. Normally, such icons are packaged with the application itself and are installed and displayed by the operating system (OS) of the user equipment; however, it has been determined that there are several disadvantages to relying upon and utilizing such pre-packaged icons. Thus, the system can be advantageously utilized to remotely acquire customized icons from a web server, such the service platform, for applications installed on a user device and make the icons and any other desired information regarding the installed applications in a customized application user interface or application viewer. For example, the system could be used to provide a viewer or browser on the user device for all applications or category of applications on the user device, which can be used by the user to access the applications or category of applications. The viewer (user interface) can be provided for any variety of categories of applications, for example, game files, financial applications, news applications, weather applications, web browser applications, or any executable file/application. In other embodiments, media files, such as music and video, can employ the viewer. The viewer can be provided with an icon and/or any other information that the service platform provides thereto, such as, title information, description, ratings, reviews, updating or purchasing information, etc. For example, the system could be used to provide a viewer or browser on the user device for all applications or category of applications on the user device, which can be used by the user to access the applications or category of applications. According to other embodiments, the viewer or browser may be used to provide information, e.g., icons, about applications that are not installed to the user device, but which could be used/installed in the user device.

In an example embodiment, the system could be used to provide a game viewer or browser on the user device for all games on the user device, which can be used by the user to access the games. If a user device were to rely upon and utilize pre-packaged icons, then the size and nature of icons that are packaged with the application and installed by the OS are disadvantageously defined by the OS. Furthermore, if a browser were to rely upon the use of such pre-packaged icons, and if a game were installed on the device and did not include such a pre-packaged icon or did not conform to the OS requirements, then that game would not be present in the OS browser and would not be accessible via the OS browser. Accordingly, in a game viewer or browser according to an example embodiment herein, the game viewer or browser can advantageously display custom icons, rather than only icons conforming with OS requirements, and the size and shape of such custom icons can be different from those required by the OS. Such custom icons can be obtained from the service platform and displayed in the game viewer.

In an example embodiment, a game viewer is used to display custom icons for all games as installed to the device by the device OS. The icons are retrieved from a server, such as service platform 107. Thus, for example, such a viewer could be capable of automatically displaying in a single place, using custom icons, all games installed to the device, regardless of whether the games are native to the device, or third party games. Note also that the applications or games that actually appear within the viewer can be controlled from the service platform, since the service platform can determine which games will have an icon assigned thereto. For example, the service provider may want to restrict display to only those games that are considered to be of a certain high quality. Also, the service platform can be used to control the visual aspects of the items shown in the viewer (e.g., the design/size/shape/etc. of the icon and any other information provided therewith, such as the title, description, ratings, reviews, available upgrades, advertising etc.).

In an example embodiment, a user interface application, such as a custom game viewer, queries the native OS of the user device for all installed applications, for example, from a storage database thereon. The user interface application will retrieve a list of unique identifiers for the installed applications. For example, the unique identifiers could be UIDs (unique identifiers), or a list of application names and versions (e.g., for UNIX OS applications), etc. At this point, the game viewer need not know which application is a game and which is not. Then, the custom game viewer queries a backend server, such as service platform 107, which returns a list of all known games by the service to the mobile device. The game viewer then generates another list which is the intersection of the list of unique identifiers of applications on the mobile device and the list of all known games. Thus, at this point, the game viewer can determine a list of all installed applications which are known to be of a particular category (e.g., games, etc.) based on the information sent from the backend server. The game viewer then queries the backend server and iteratively retrieves custom game icons for each identified game in the intersection list above. Also, it is contemplated that a batch process can be employed.

According to an embodiment, the game viewer can be provided as a web application (or a "widget"). The icons displayed on the game viewer represent actual games that are natively installed to the device. However, the icons are not necessarily provided with the game and are not installed when the game is initially installed, but rather the icons are fetched from a backend.

A motivation for such an embodiment is a desire to make all (or a selected set of) games on a mobile device appear in a game viewer, no matter what those games are, or where the games are installed to in the device, or whether the games were initially provided with an icon.

Accordingly, such a motivation can be satisfied by a web based solution that provides that content to be displayed in such a viewer can come from a backend service run e.g. by a service provider or third party. A clear advantage of such a system is the flexibility associated with use of online information used to control how and what games are viewable within a game viewer application. For example, at any time the icon for an existing installed game could be changed to indicate an update or a game add-on for the game that is now available, and optionally the changed icon could allow access to the update or add-on. The icons are not necessarily provided with the game and are not installed when the game is actually installed, but rather they are fetched from a backend. Accordingly, this approach advantageously provides a game viewer that can show icons for games, irrespective of how such games were packaged, or what platform they were designed to operate on.

While it is expected that online connectivity is becoming more and more the norm, the fact that online connectivity is preferred at least initially in order to make installed games visible might sometimes be regarded as a disadvantage. This can be mitigated, e.g., by the fact that the game icons can be cached for offline use. and/or by embedding an initial cache during factory provisioning of the user equipment.

Figure 2:
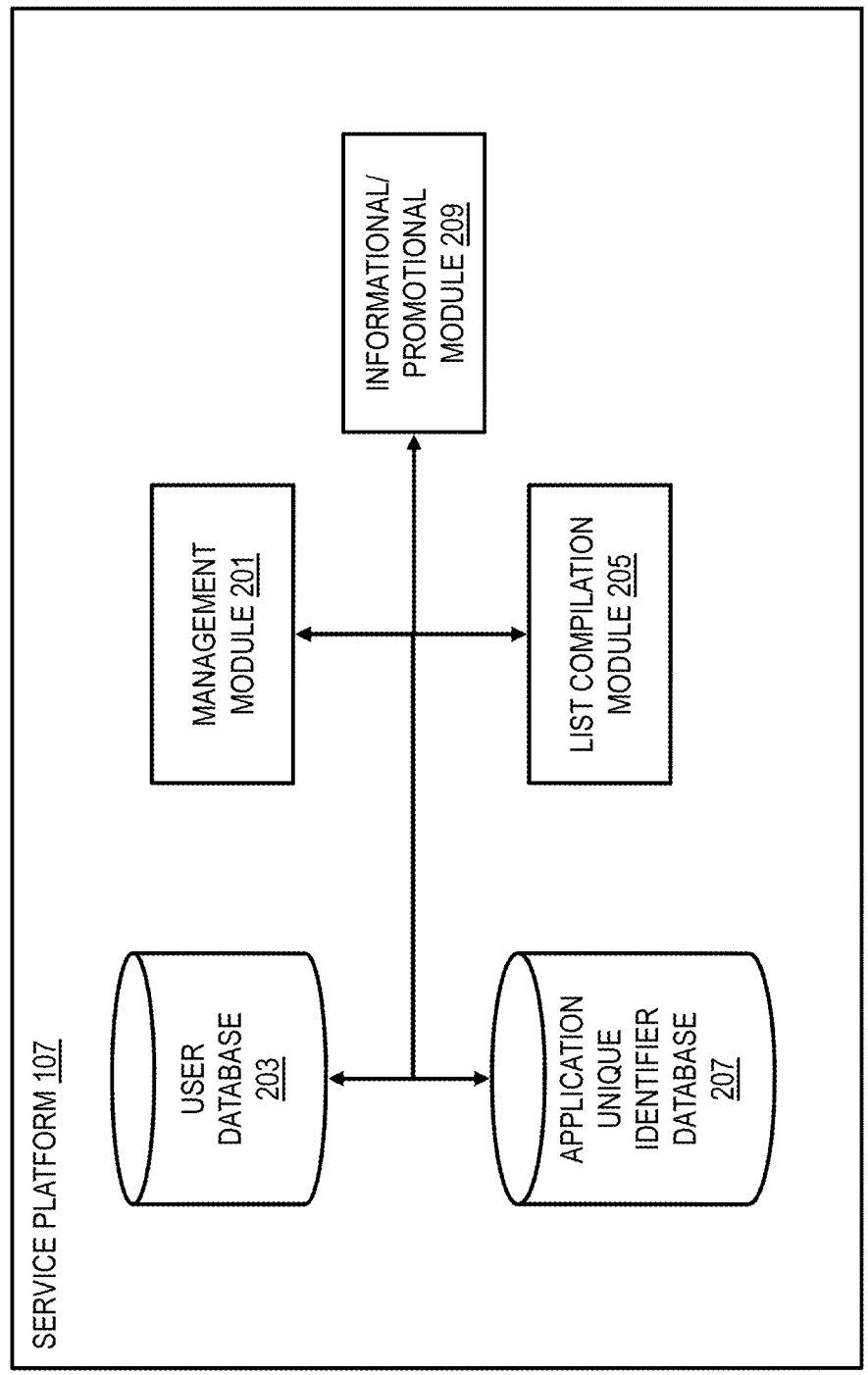
FIG. 2 is a diagram of components of a service platform configured to provide information regarding applications that are installed on user equipment, according to an example embodiment.

FIG. 2 is a diagram of components of a service platform 107 configured to provide information regarding applications that are installed on user equipment, according to an example embodiment. The service platform 107 includes a management module 201, a user database 203, a list compilation module 205, an application unique identifier database 207, and an informational/promotional module 209. The management module 201, in conjunction with the user database 203, manages any incoming requests in order to determine whether the request is from a valid user of the system, and to manage any billing data that is generated by such a request or usage of the system by the user. The management module 201 can authenticate the device sending the request and determine the user's authorization to access the service platform 107.

Once the request is validated, then the list compilation module 205 can analyze any incoming requests from user equipment requesting, for example, unique identifiers for known applications, information regarding matched unique identifiers, or information regarding one or more installed applications, as will be discussed in greater detail with respect to the embodiments in FIGS. 5A, 5B, 6A, and 6B. The list compilation module 205 can access the application unique identifier database 207 and the informational/promotional module 209 to compile the desired lists of information in response to the request(s) from the user equipment. Once the desired list of information is compiled by the module 205, the list compilation module 205 can send the information to the user equipment via network 105 or via some other means (e.g., by mailing a storage medium storing such application, etc.).

Figure 3:
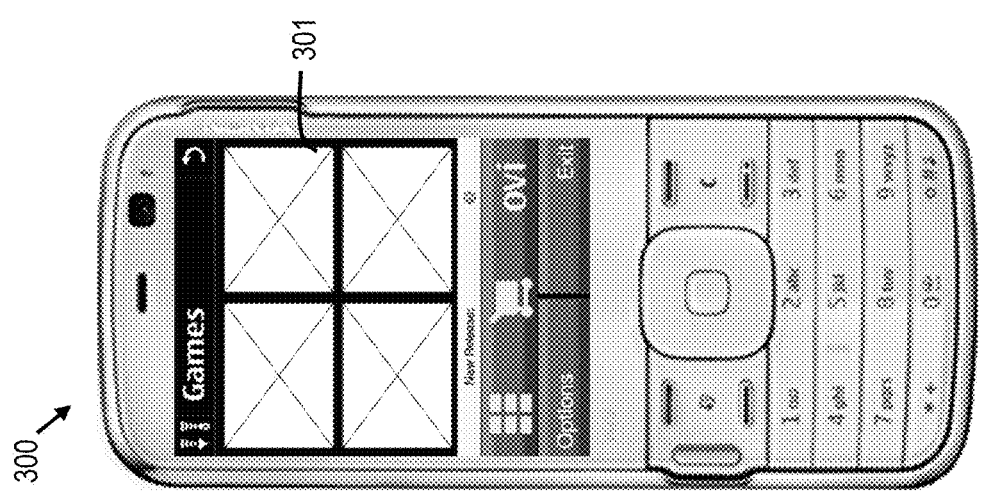
FIG. 3 is a mobile device having a display that can present a user interface showing information regarding applications that are installed on the mobile device, according to one embodiment.

FIG. 3 is an example embodiment of user equipment in the form of a mobile device 300 having a display 301 that can present a user interface showing information regarding applications that are installed on the mobile device, according to one embodiment. A user can utilize the various selection buttons beneath the display 301 in order to interact with the user interface. Alternatively, or in addition to the use of the selection buttons, the display 301 can be a touchscreen that can allow a user to interact with the user interface by contacting the display. These are just examples, and various alternatives for presenting a user interface and interacting with one are known in the art including, but not limiting to, additional input and output arrangements such as additional keyboard, gesture-based input means and projection display. The embodiments of the invention are not restricted by the presentation arrangements of the user interface and could be applied in various ways by a person of ordinary skill in the art to presentation arrangements unknown at the time of the invention.

Figure 4:
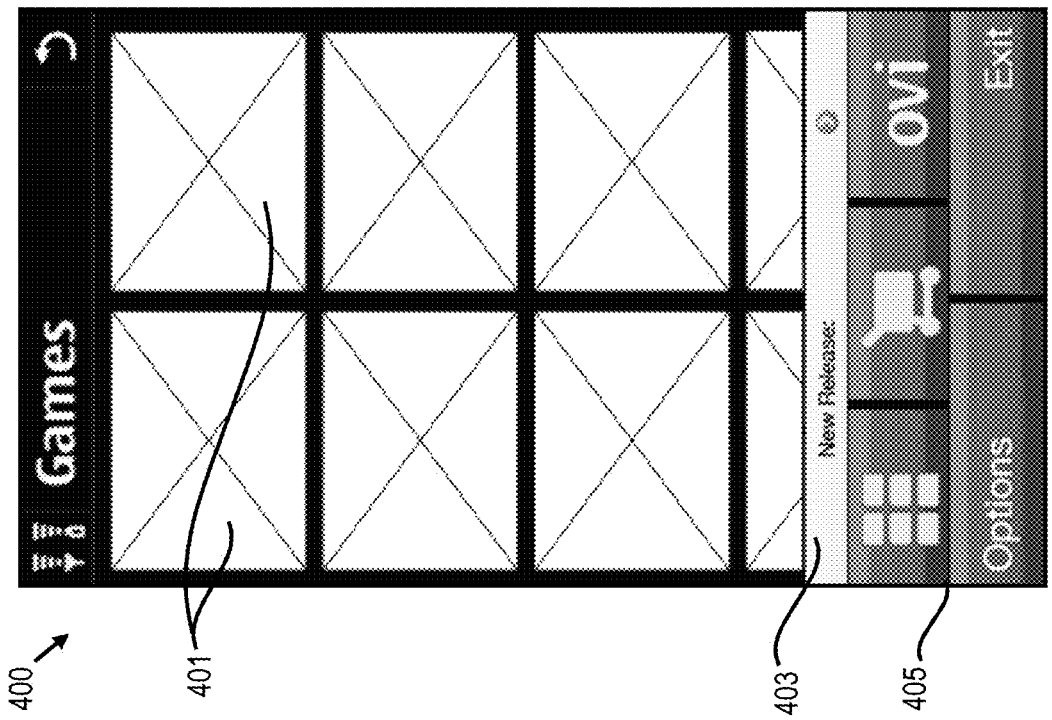
FIG. 4 is a screenshot of a user interface showing information regarding applications that are installed on user equipment, according to one embodiment.

FIG. 4 is a screenshot of a user interface 400 showing information regarding applications that are installed on user equipment, according to one embodiment. The screenshot 400 shows an example game viewer, which includes a plurality of different icons 401 (shown generically here as an "X" for simplicity). The icons 401 can include a graphic depiction of the game, game title, characters, etc. The user can scroll through the various icons 401, for example, using the selections buttons of the user equipment or using touchscreen features. The icons 401 can also include, or an area beneath the icons can be provided, that displays other information regarding the game, such as game titles, reviews, rankings, descriptions, availability of upgrades/updates, advertising etc.

In the embodiment depicted in FIG. 4, the user interface 400 includes an area 403 that can include information regarding new releases (e.g., newly launched games that can be purchased and/or downloaded from the service provider) and a link (e.g., the arrow button icon shown in area 403) that can take the user interface to an online store listing such new release(s). Additionally, the embodiment of the user interface 400 shown in FIG. 4 also includes an area 405 that includes various control buttons icons that can be activated by the user to toggle between different display layouts for the game icons, link the user interface to an online shopping cart of the user, link the user to an online store or community, to access an options menu, and to exit the user interface. Various different links and menus can be provided to allow the user to select preferences for the display, enhance the aesthetics of display, enhance the usage/usefulness of the display, etc. The screenshot shown in FIG. 4 is merely illustrative, and any number or variety of different display layouts and buttons can be defined.

FIG. 5A is a flowchart of a process 500 for requesting, receiving, and presenting information regarding applications that are installed on user equipment, according to one embodiment.

In the embodiment of FIG. 5A, a user interface application on user equipment determines unique identifiers for all installed applications on the user equipment in step 501. For example, a custom game viewer can query the native OS of a mobile device for all installed applications, for example, from a storage database thereon. Thus, the game viewer will retrieve a list of unique identifiers for the installed applications. Then, in step 503, the user interface application requests information regarding unique identifiers for all known applications of a particular category of application from a service provider service platform, such as service platform 107. In step 505, the user interface application receives information regarding unique identifiers for known applications of the category of application. For example, the example game viewer queries a backend server of a service provider, which returns a list of all known games to the mobile device.

In step 507, the user interface application compares the unique identifiers for the installed applications with the unique identifiers for all known applications of the category of applications received from the service platform to match the installed applications with known applications. Thus, in the game viewer example, the game viewer compares the list of unique identifiers of all installed applications to the list of unique identifiers of all known games, and generates another list which is the intersection of the two lists. Thus, at this point, the game viewer can determine a list of all installed applications which are known to be of a particular category (i.e., games) based on the information sent from the backend server.

Then, in step 509, the user interface application initiates a transmission to the service platform to request information regarding the matched unique identifiers found during the comparison in step 507, and in step 511 the user interface application receives information (e.g., icons, title, description, reviews, rankings, upgrade/update information, offers, advertising etc.) for the matched unique identifiers. For example, the game viewer queries the backend server using the intersection list described above and iteratively retrieves custom game icons for each identified game in the intersection list. In step 513, the user interface application presents the information including the icon(s) for the installed application(s) in a user interface, for example, in the manner depicted in FIG. 4.

It is noted that each of the steps in FIG. 5A can be performed by the user equipment, or, alternatively, one or more of the steps can be performed by another device for applications installed on the user equipment. For example, one or more of the steps could be performed by another device, such as a personal computer, that is in communication with the user equipment. In one such embodiment, a user views on the personal computer the games that are installed on the user equipment (e.g., a mobile). The user equipment could be connected to the personal computer to enable transmission of data between the personal computer user interface and the user equipment. Then, the user interface application could be on the personal computer, or it could be on the user equipment and controlled through the personal computer. This can be used, for example, in a situation where the user wants to manage the user equipment via a personal computer user interface. Thus, the personal computer can perform, for example, steps 501-511 in communication with both the user equipment and the service provider service platform, and then transmit the resulting information to the user equipment, which then presents the information in a user interface on the user equipment in step 513, for example, in the manner depicted in FIG. 4.

Figure 5B:
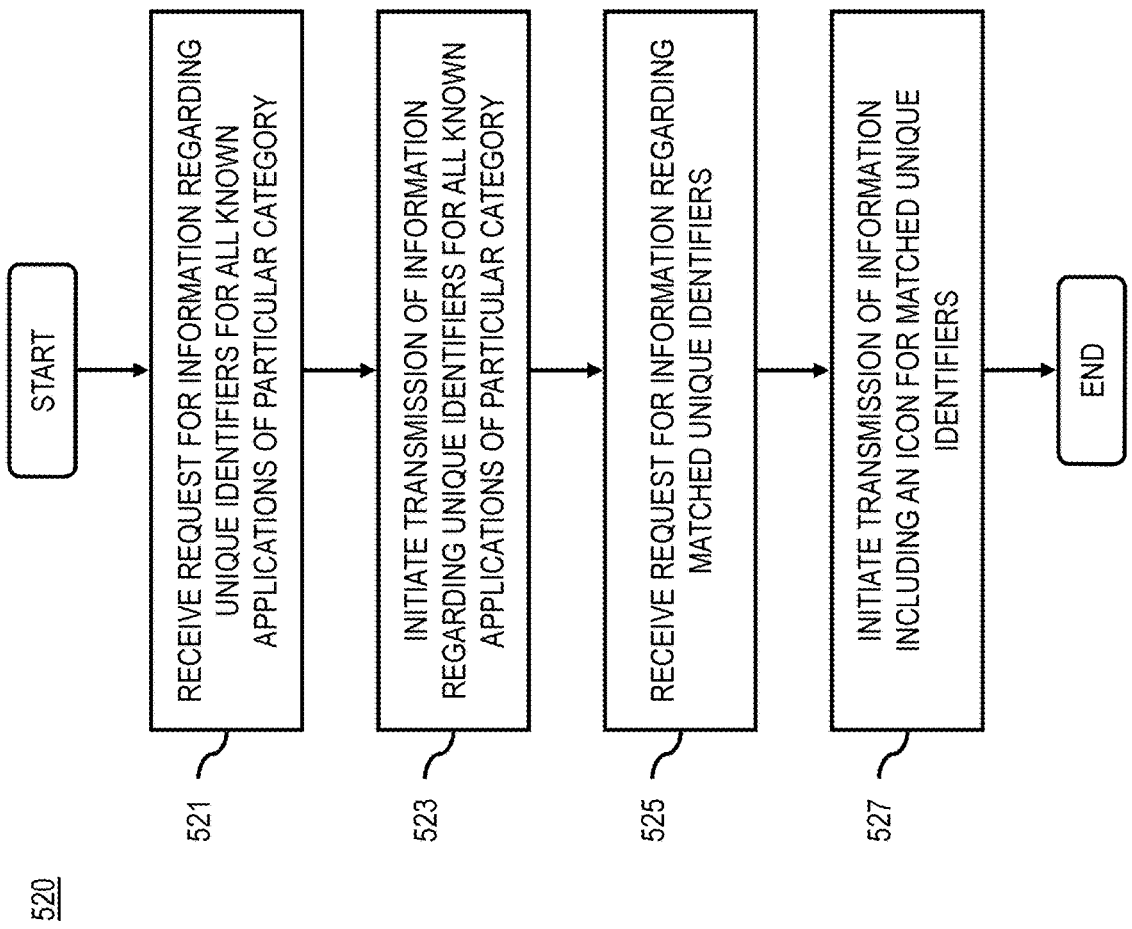
FIG. 5B is a flowchart of a process for receiving a request for information regarding matched unique identifiers and initiating transmission of the information, according to one embodiment.

FIG. 5B is a flowchart of a process 520 for receiving a request for information regarding matched unique identifiers and initiating transmission of the information, according to one embodiment.

In the embodiment of FIG. 5B, the service platform receives a request for information regarding unique identifiers for all known applications of a particular category of application in step 521. Thus, for example, the list compilation module 205 can access the application unique identifier database 207 to obtain a list of such information, which can be maintained and updated by the service provider. Then, in step 523, the service platform initiates transmission of information regarding unique identifiers for all known applications of the particular category of applications to the user interface application on the user equipment that sent the request.

Then, in step 525, the service platform receives a request for information regarding applications that correspond to a list of matched unique identifiers. Thus, for example, the list compilation module 205 can access the application unique identifier database 207 and/or the informational/promotional module 209 to obtain information (e.g., icons, title, description, reviews, rankings, upgrade/update information, offers, advertising etc.) for the matched unique identifiers that correspond to a particular application. Then, in step 527, the service platform initiates transmission of information including an icon for the matched unique identifiers to the user interface application on the user equipment that sent the request.

Figure 6A:
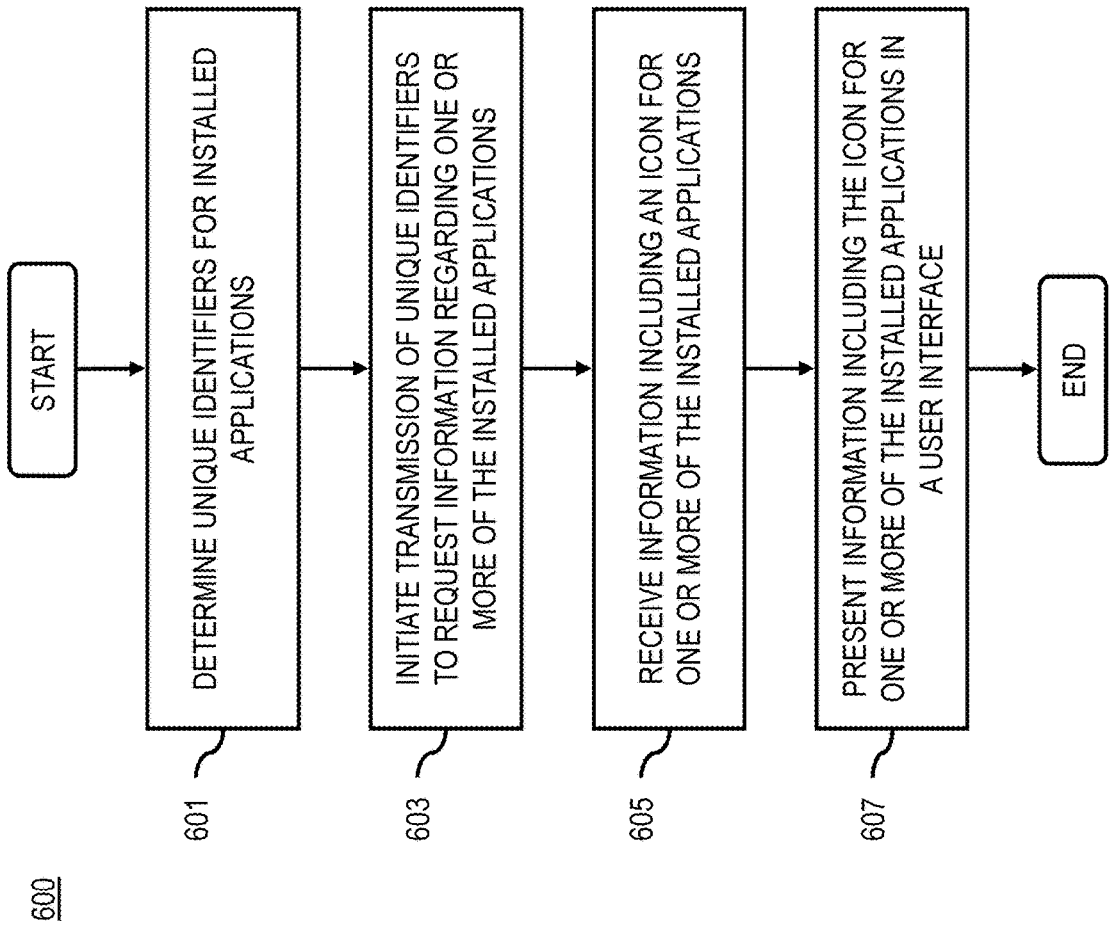
FIG. 6A is a flowchart of a process for requesting, receiving, and presenting information regarding applications that are installed on user equipment, according to another embodiment.

FIG. 6A is a flowchart of a process 600 for requesting, receiving, and presenting information regarding applications that are installed on user equipment, according to another embodiment.

In the embodiment of FIG. 6A, a user interface application on user equipment determines unique identifiers for installed applications on the user equipment in step 601. Then, in step 603, the user interface application initiates transmission of the unique identifiers to request information regarding a category (or subset) of application for one or more of the installed applications from a service provider service platform, such as service platform 107. In step 605, the user interface application receives information regarding the one or more installed application(s) in the application category. And, in step 607, the user interface application presents the information including the icon(s) for the one or more installed application(s) in the application category, for example, in the manner depicted in FIG. 4. Thus, in the request in step 603, a particular subset or category of applications can be identified as being the target of the request, and therefore the service platform can determine which of the installed applications fall within the subset or category, and thereby send information including an icon to the user equipment for the applications that fall within the subset or category.

Figure 6B:
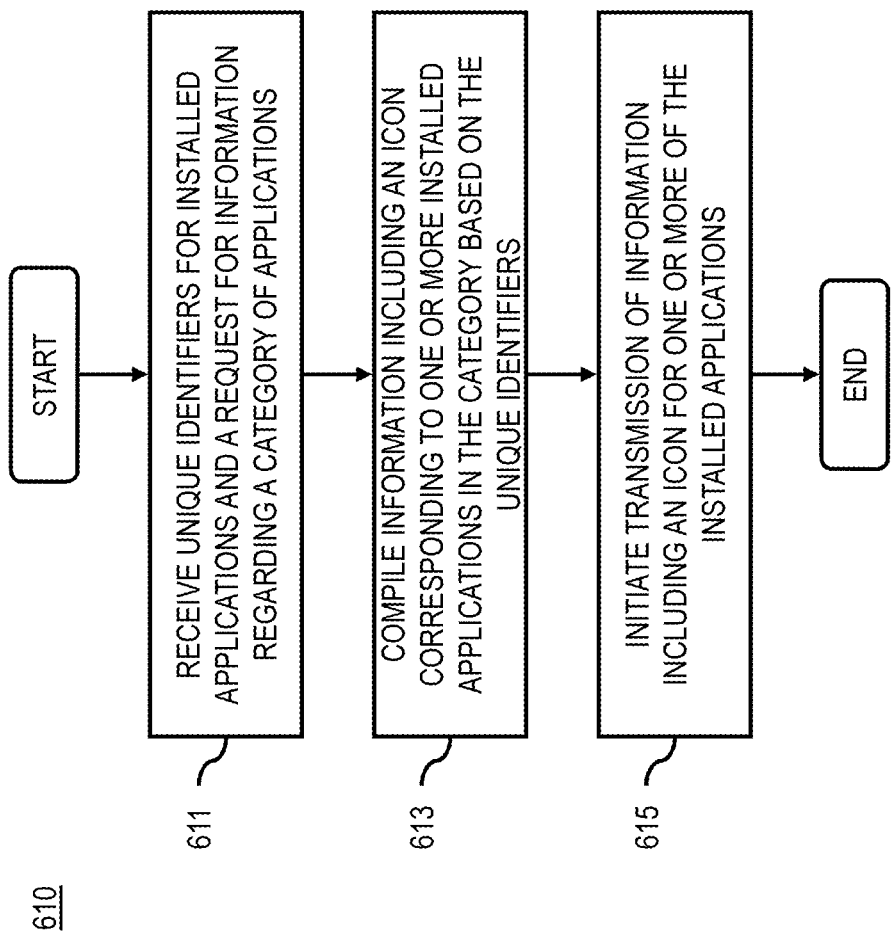
FIG. 6B is a flowchart of a process for compiling and initiating transmission of information regarding applications that are installed on user equipment, according to another embodiment.

FIG. 6B is a flowchart of a process 610 for compiling and initiating transmission of information regarding applications that are installed on user equipment, according to another embodiment.

In the embodiment of FIG. 6B, the service platform receives unique identifiers for all applications installed on the user equipment and a request for information regarding a category of applications in step 611. Then, in step 613, the service platform compiles information including an icon, etc. regarding one or more installed applications in the application category based on the unique identifiers. Then, in step 615, the service platform initiates transmission of information including an icon for the one or more installed applications in the application category to the user interface application on the user equipment that sent the request.

In the example embodiments, the service platform can store data regarding the installed applications and/or matched applications on a particular user equipment, and can therefore transmit periodic update information to the user equipment regarding the installed applications and/or matched applications on the user equipment. Thus, the service platform can update or modify a particular icon for an application, or any of the other information regarding the application that was previously transmitted to the user equipment, such as the reviews, rankings, descriptions, available update/upgrade information, etc.

FIGS. 6A and 6B set forth alternative embodiments of processes of communication between the service platform and the user equipment. The amount of data being transmitted in the processes of FIGS. 5A and 5B differs from the amount of data being transmitted in the processes of FIGS. 6A and 6B. Thus, whether one of the processes is used or the other (or some combination or variation thereof within the scope of the disclosure set forth herein) can depend upon the communication system utilized, the user equipment specifications, the network load, the desired information database updating/management configurations, etc. Also, it is noted that embodiment in FIGS. 5A and 5B might be considered to advantageously minimize privacy concerns, since only the matched unique identifiers are used to request information, and not unique identifiers for all installed application on the user equipment. Furthermore, it is noted that the various embodiments advantageously provides the user equipment with the ability to determine the application type/category for certain installed applications based on the received information for applications in the category.

It is noted that the determining of the category of installed applications can be performed in various configurations (e.g., by the UE or the server side), and with various combinations of embodiments. The UE can, for example, request a list of UIDs for all known applications in a category, and compare that list to the installed applications of the UE. Alternatively, or in addition thereto, the UE can, for example, send a list of UIDs for all installed applications of the UE to the server with a request for information, wherein the information received by the UE can then comprise the category and corresponding icon for an installed application, for example. Alternatively, or in addition thereto, that request could also comprise an indication of a particular category of applications, and the information would be requested for all known applications only in that particular category.

Furthermore, it is noted that the icon(s) are not necessarily transmitted with the category information, but the icon(s) can be transmitted with the category information in example embodiments.

The processes described herein for providing information regarding installed applications on user equipment may be implemented via software, hardware, e.g., general processor, Digital Signal Processing (DSP) chip, an Application Specific Integrated Circuit (ASIC), Field Programmable Gate Arrays (FPGAs), etc., firmware or a combination thereof. Such example hardware for performing the described functions is detailed below.

Figure 7:
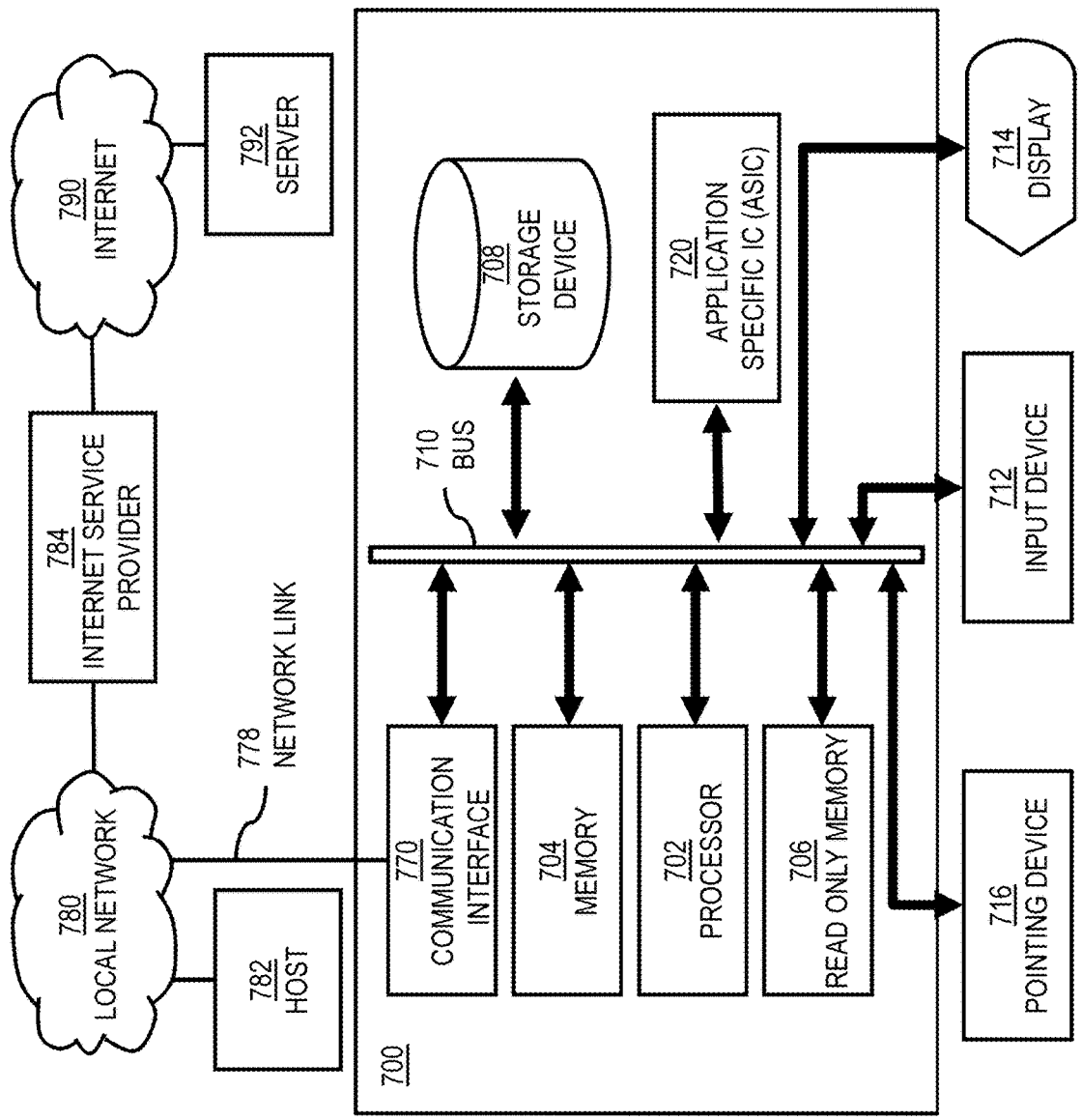
FIG. 7 is a diagram of hardware that can be used to implement an embodiment of the invention.

FIG. 7 illustrates a computer system 700 upon which an embodiment of the invention may be implemented. Computer system 700 is programmed to provide information regarding installed applications on user equipment as described herein and includes a communication mechanism such as a bus 710 for passing information between other internal and external components of the computer system 700. Information (also called data) is represented as a physical expression of a measurable phenomenon, for example electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to information regarding installed applications on user equipment. The set of operations include bringing information in from the bus 710 and placing information on the bus 710. The set of operations also include, for example, comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for acquiring information regarding installed applications on user equipment. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for acquiring information regarding installed applications on user equipment, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for acquiring information regarding installed applications on user equipment.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server host 792 connected to the Internet hosts a process that provides a service in response to information received over the Internet. For example, server host 792 hosts a process that provides information representing video data for presentation at display 714.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
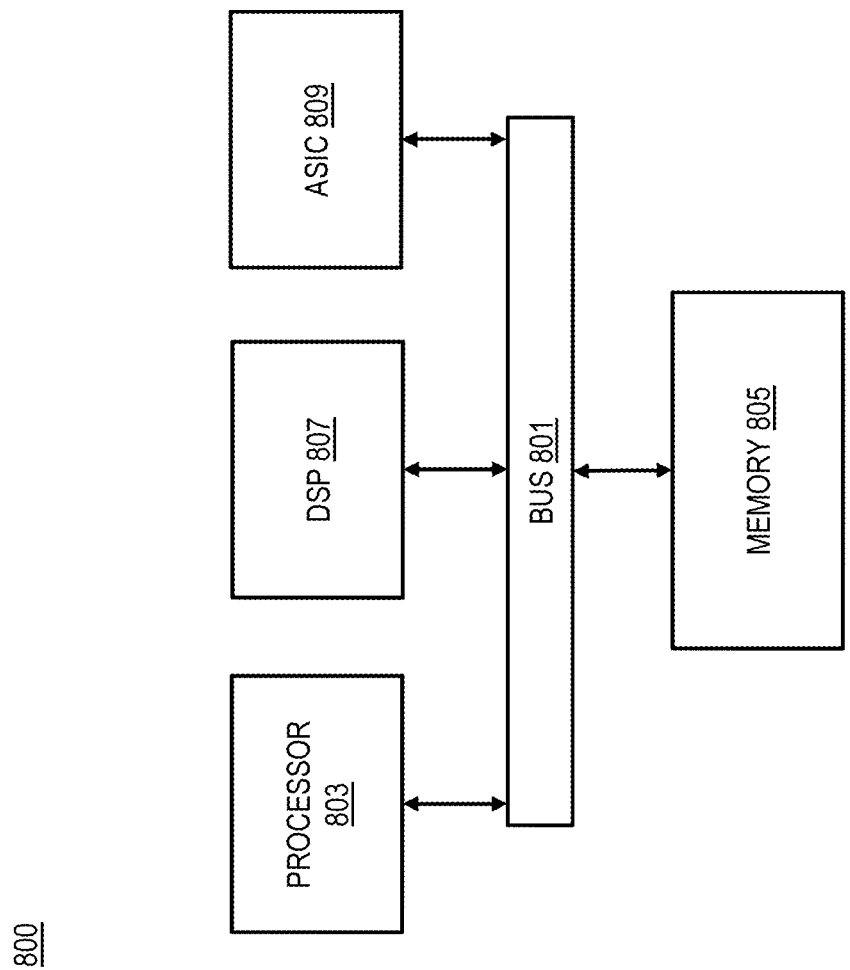
FIG. 8 is a diagram of a chip set that can be used to implement an embodiment of the invention.

FIG. 8 illustrates a chip set 800 upon which an embodiment of the invention may be implemented. Chip set 800 is programmed to associate applications as described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory

805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the processes described herein to retrieve information regarding installed applications on user equipment. The memory 805 also stores the data associated with or generated by the execution of the described processes.

Figure 9:
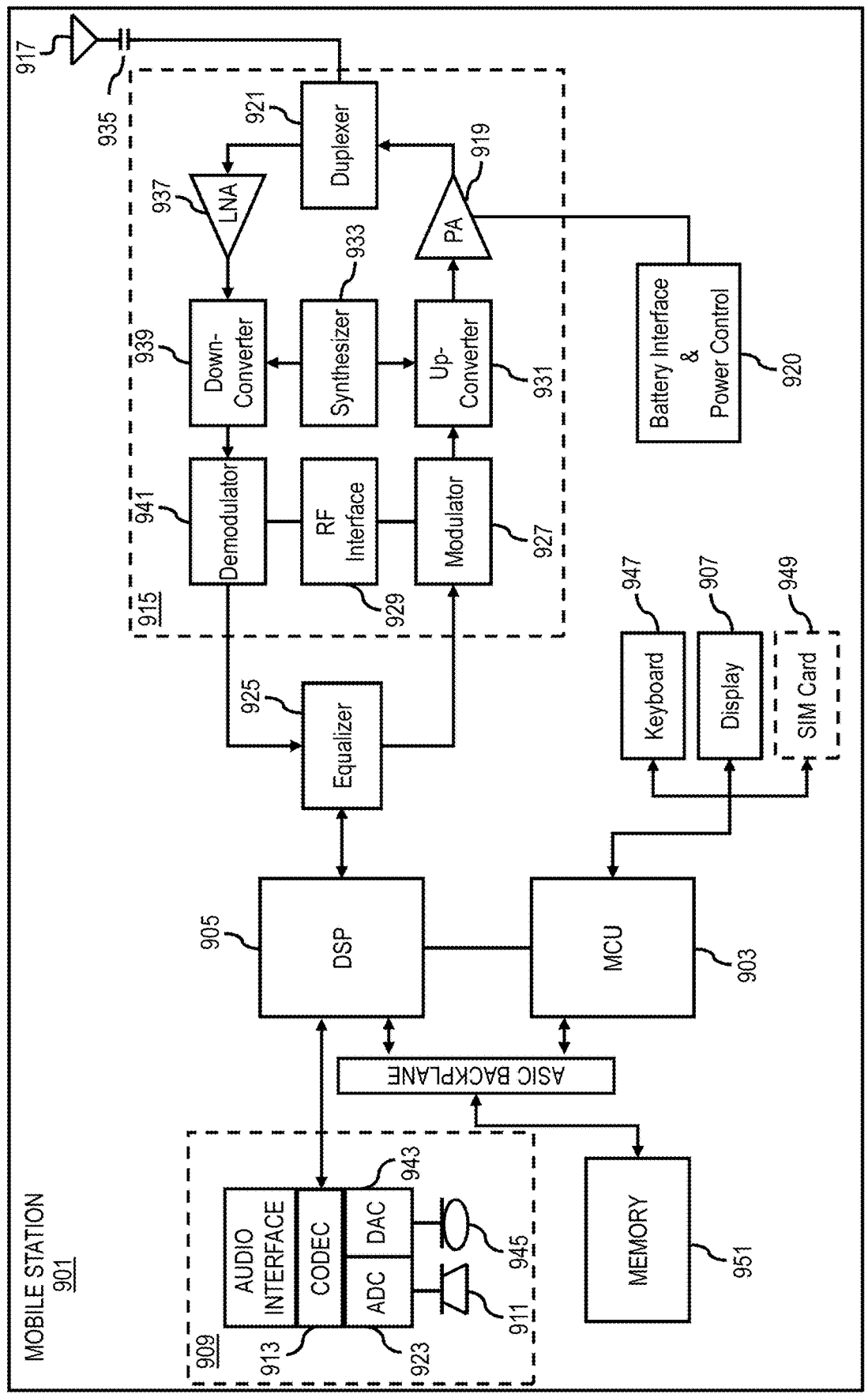
FIG. 9 is a diagram of a mobile station (e.g., handset) that can be used to implement an embodiment of the invention.

FIG. 9 is a diagram of example components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Typical internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions, such as widgets. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 according to, for example, an multi-touch user interface. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a network server, a request from a user equipment for information regarding one or more applications installed on the user equipment, wherein the request includes a respective unique identifier for the one or more applications;
   compiling, by the network server, the information corresponding to the one or more applications based on the respective unique identifier; and
   initiating, by the network server, transmission of the information to the user equipment, the information including at least one customized application icon that is pre-set by the network server corresponding to the one or more applications prior to the request,
   wherein the network server customizes one or more attributes of the at least one customized application icon as different from at least one pre-packaged application icon, and wherein the one or more attributes are associated with one or more visual aspects of the at least one customized application icon.

2. A method of claim 1, further comprising:
   receiving, by the network server, a request from the user equipment for information regarding all applications that are in one application category and installed on the user equipment;
   determining, by the network server, that at least one of the applications does not include a pre-packaged application icon to be presented on the user equipment, or that a pre-packaged application icon of the at least one application does not conform to one or more operation system requirements of the user equipment; and
   in response to the determination, initiating, by the network server, transmission of the at least one customized application icon for the at least one application installed on the user equipment in the application category to the user equipment.

3. A method of claim 1, wherein the receiving, by the network server, of the request for information includes receiving, by the network server, the unique identifiers for all applications installed on the user equipment and an indication of the application category, and compiling, by the network server, the information including the at least one customized application icon by determining which of the unique identifiers for all installed applications correspond to the indicated category of applications.

4. A method of claim 1, wherein the at least one customized application icon is presented at the user equipment to represent the one or more applications in place of the at least one pre-packaged application icon associated with the one or more applications.

5. A method of claim 4, wherein the at least one customized application icon is presented in a viewer application executing on the user equipment.

6. A network server comprising:
   at least one processor; and
   at least one memory including computer program code,
   the at least one memory and the computer program code configured to, with the at least one processor, cause the apparatus to perform at least the following:
      receive a request from a user equipment for information regarding one or more applications installed on the user equipment, wherein the request includes a respective unique identifier for the one or more applications;
      compile the information corresponding to the one or more applications based on the respective unique identifier; and
      initiate transmission of the information to the user equipment, the information including at least one customized application icon that is pre-set by the network server corresponding to the one or more applications prior to the request,
      wherein the network server customizes one or more attributes of the at least one customized application icon as different from at least one pre-packaged application icon, and wherein the one or more attributes are associated with one or more visual aspects of the at least one customized application icon.

7. A network server of claim 6, wherein the apparatus is further caused to:
   receive a request from the user equipment for information regarding all applications that are in one application category and installed on the user equipment;
   determine that at least one of the applications does not include a pre-packaged application icon to be presented on the user equipment, or that a pre-packaged application icon of the at least one application does not conform to one or more operation system requirements of the user equipment; and
   in response to the determination, initiate transmission of the at least one customized application icon for the at least one application installed on the user equipment in the application category to the user equipment.

8. A network server of claim 6, wherein the receiving of the request for information includes receiving the unique identifiers for all applications installed on the user equipment and an indication of the application category, and compiling the information including the at least one customized application icon by determining which of the unique identifiers for all installed applications correspond to the indicated category of applications.

9. A network server of claim 6, wherein the at least one customized application icon differs from a size, a shape, or a combination thereof required by an operating system of the user equipment.

10. A method comprising:
- initiating, by a user terminal, transmission of a request for information regarding one or more applications installed on the user equipment, wherein the request includes a respective unique identifier for the one or more applications; and
- receiving, by the user terminal from a network server, the information including at least one customized application icon that is pre-set by the network server as corresponding to at least one of the applications prior to the request and compiled using the respective unique identifier for the one or more applications,
- wherein one or more attributes of the at least one customized application icon are customized by the network server as different from at least one pre-packaged application icon, and wherein the one of more attributes are associated with one or more visual aspects of the at least one customized application icon.

11. A method of claim 10, wherein the initiating, by the user terminal, of the transmission of the request for information includes initiating, by the user terminal, transmission of the unique identifiers for all applications that are in one application category and installed on the user equipment; and
- receiving, by the user terminal, information comprising the at least one customized application icon for the at least one application installed on the user equipment and corresponding to the indicated category of applications, when either at least one of the applications does not include a pre-packaged application icon to be presented on the user equipment, or a pre-packaged application icon of the at least one application does not conform to one or more operation system requirements of the user equipment.

12. A method of claim 11, wherein the at least one application does not include a pre-packaged application icon to be presented in a user interface on the user equipment, and wherein the at least one customized application icon is received and presented in the user interface for the at least one application.

13. A method of claim 10, further comprising:
- presenting, by the user terminal, the information including the at least one customized application icon in a user interface on the user equipment to allow a user to access the at least one application.

14. A method of claim 10, further comprising:
- presenting, by the user terminal, the information including the at least one customized application icon in a user interface on the user equipment to allow a user to access an update for the at least one application.

15. A user terminal comprising:
- at least one processor; and
- at least one memory including computer program code,
- the at least one memory and the computer program code configured to, with the at least one processor, cause the apparatus to perform at least the following:
  - initiate transmission of a request for information regarding one or more applications installed on a user equipment, wherein the request includes a respective unique identifier for the one or more applications; and
  - receive from a network server the information including at least one customized application icon that is pre-set by the network server as corresponding to at least one of the applications prior to the request and compiled using the respective unique identifier for the one or more applications,
  - wherein one or more attributes of the at least one customized application icon are customized by the network server as different from at least one pre-packaged application icon, and wherein the one of more attributes are associated with one or more visual aspects of the at least one customized application icon.

16. A user terminal of claim 15, wherein the apparatus is further caused to:
- include, in the request for information, the unique identifiers for all applications installed on the user equipment and an indication of the application category, and
- receive information comprising the at least one customized application icon for the at least one application installed on the user equipment and corresponding to the indicated category of applications, when either at least one of the applications does not include a pre-packaged application icon to be presented on the user equipment, or a pre-packaged application icon of the at least one application does not conform to one or more operation system requirements of the user equipment.

17. A user terminal of claim 15, wherein the apparatus is further caused to:
- present the information including the at least one customized application icon in a user interface on the user equipment to allow a user to access the at least one application.

18. A user terminal of claim 15, wherein the apparatus is further caused to:
- present the information including the at least one customized application icon in a user interface on the user equipment to allow a user to access an update for the at least one application.

19. A user terminal of claim 15, wherein the at least one customized application icon is received from a service platform, and wherein the service platform controls which of the respective applications to present in a user interface, or controls the one or more visual aspects of the at least one customized application icon presented in the user interface.

* * * * *